United States Patent [19]

Bourbour et al.

[11] Patent Number: 5,785,361
[45] Date of Patent: Jul. 28, 1998

[54] FEEDWATER NOZZLE THERMAL SLEEVE

[75] Inventors: Siamak Bourbour; Gerald Alan Deaver, both of San Jose, Calif.

[73] Assignee: General Electric Company, Schenectady, N.Y.

[21] Appl. No.: 620,109

[22] Filed: Mar. 21, 1996

[51] Int. Cl.⁶ .................................................. G21C 13/032
[52] U.S. Cl. .................................................. 285/382; 376/204
[58] Field of Search ........................... 285/47, 106, 110, 285/189, 286, 382, 917; 376/203, 204

[56] References Cited

U.S. PATENT DOCUMENTS

| | | | |
|---|---|---|---|
| 4,168,071 | 9/1979 | Jacobson et al. | 376/203 X |
| 4,174,123 | 11/1979 | Schluderberg | 376/203 X |
| 4,324,616 | 4/1982 | Marmorat et al. | 376/203 |
| 4,597,596 | 7/1986 | Tozer | 285/917 X |
| 4,834,935 | 5/1989 | Daigle et al. | 376/204 X |
| 4,844,274 | 7/1989 | Sterk | 376/204 X |
| 5,345,484 | 9/1994 | Deaver et al. | 376/204 X |

*Primary Examiner*—John A. Ricci
*Attorney, Agent, or Firm*—Armstrong, Teasdale, Schlafly & Davis

[57] ABSTRACT

A thermal sleeve for insertion into a feedwater nozzle bore of a reactor pressure vessel for a nuclear reactor is described. In one embodiment, the sleeve includes a substantially cylindrical main body and a substantially cylindrical interference ring. The interference ring has a first secured end and a second free end. The interference ring is connected at the first secured end to an exterior surface of the substantially cylindrical main body. An interference surface is located at the second free end of the ring. The second free end of the cylindrical interference ring is biased so that when the sleeve is positioned in the nozzle bore, the second free end is biased towards the nozzle bore wall. In one embodiment, the second free end is biased into contact with a surface of an outer sleeve which also is positioned in the nozzle bore. The connector, a nozzle safe end wall, the outer sleeve and the inner sleeve cooperate to define a stagnant water area. A first end of the thermal sleeve interfaces with a connector for connecting the sleeve to a feedwater line. A second end of the sleeve interfaces with a feedwater sparger T-box having openings for spraying water delivered by the feedwater line into the RPV.

14 Claims, 2 Drawing Sheets

FEEDWATER NOZZLE THERMAL SLEEVE

FIELD OF THE INVENTION

This invention relates generally to feedwater nozzles in nuclear reactors and, more particularly, to a thermal sleeve for use in connection with such feedwater nozzles for preventing leakage flow.

BACKGROUND OF THE INVENTION

Boiling water nuclear reactors (BWRs) typically include a reactor pressure vessel (RPV) having a core of fuel bundles positioned therein. Water is supplied to the RPV through a plurality of feedwater nozzles which extend through the RPV wall and enable water to be supplied to the interior of the RPV from an external source. More specifically, a thermal sleeve extends through the nozzle, and water supplied from the feedwater line passes through the nozzle thermal sleeve into the RPV.

To facilitate preventing leakage of water supplied from the feedwater line, a thermal sleeve typically is located in the feedwater nozzle bore. A feedwater sparger is welded to the feedwater nozzle thermal sleeve. The feedwater sparger and the thermal sleeve typically are constructed of the same material, e.g., stainless steel, so that the sleeve and the feedwater sparger have substantially the same thermal characteristics, e.g., thermal expansion.

The nozzle, however, is constructed of a different material, e.g., low alloy steel (LAS), and has thermal characteristics different from the thermal characteristics of the thermal sleeve and feedwater sparger. As a result of the different thermal characteristics, some water may leak into a space between the thermal sleeve and nozzle. Such water leakage may cause, for example, thermal fatigue cracking in the nozzle bore.

To prevent such leakage, known attempts have been made to form a seal between the thermal sleeve and a nozzle safe end wall. Forming such seals, however, requires significant work to be performed inside the RPV which adds to the reactor shut-down time and adds to personnel radiation exposure.

It would be desirable, therefore, to provide a feedwater nozzle thermal sleeve configuration which is effective in preventing feedwater leakage flow. It also would be desirable to provide such a thermal sleeve configuration which can be relatively quickly installed so that reactor shut-down time and personnel radiation exposure are reduced as compared to the shut-down time and exposure associated with installing known thermal sleeves.

SUMMARY OF THE INVENTION

These and other objects are attained by a thermal sleeve for insertion into a feedwater nozzle bore of a reactor pressure vessel for a nuclear reactor which, in one embodiment, includes a substantially cylindrical main body and a substantially cylindrical interference ring. A first end of the thermal sleeve interfaces with a connector (safe end) for connecting the sleeve to a feedwater line. A second end of the thermal sleeve interfaces with a feedwater sparger T-box having openings for spraying water delivered by the feedwater line into the RPV.

The interference ring of the sleeve has a first secured end and a second free end. The interference ring is connected at the first secured end to an exterior surface of the substantially cylindrical main body. An interference surface is located at the second free end of the ring.

The second free end of the cylindrical interference ring is biased so that when the thermal sleeve is positioned in the feedwater nozzle bore, the second free end is biased outward towards the nozzle bore wall. In one embodiment, the second free end is biased into contact, and forms a press fit, with a surface of an outer sleeve which also is positioned in the nozzle bore. The connector, nozzle safe end wall, outer sleeve and thermal sleeve cooperate to define a stagnant water area.

The stagnant water located in the stagnant water area and the long heat conductive path between the second free end of the interference ring and the thermal sleeve main body form thermal barriers which facilitate maintaining the second free end of the interference ring heated above the colder feedwater temperature of the feedwater flowing in the main body of the thermal sleeve. As a result, the temperature of the second free end of the interference ring is maintained close to, and closely tracks, the temperature of the outer sleeve and nozzle. Therefore, the second free end of the interference ring is subjected to substantially the same thermal conditions as the outer sleeve, which enables the second free end to maintain tight contact with the outer sleeve.

The above described thermal sleeve is believed to be effective in preventing feedwater leakage flow. Such sleeve also can be relatively quickly installed so that reactor shut-down time and personnel radiation exposure are reduced as compared to the shut-down time and exposure associated with installing known thermal sleeves.

DETAILED DESCRIPTION OF THE DRAWINGS

Figure 1:
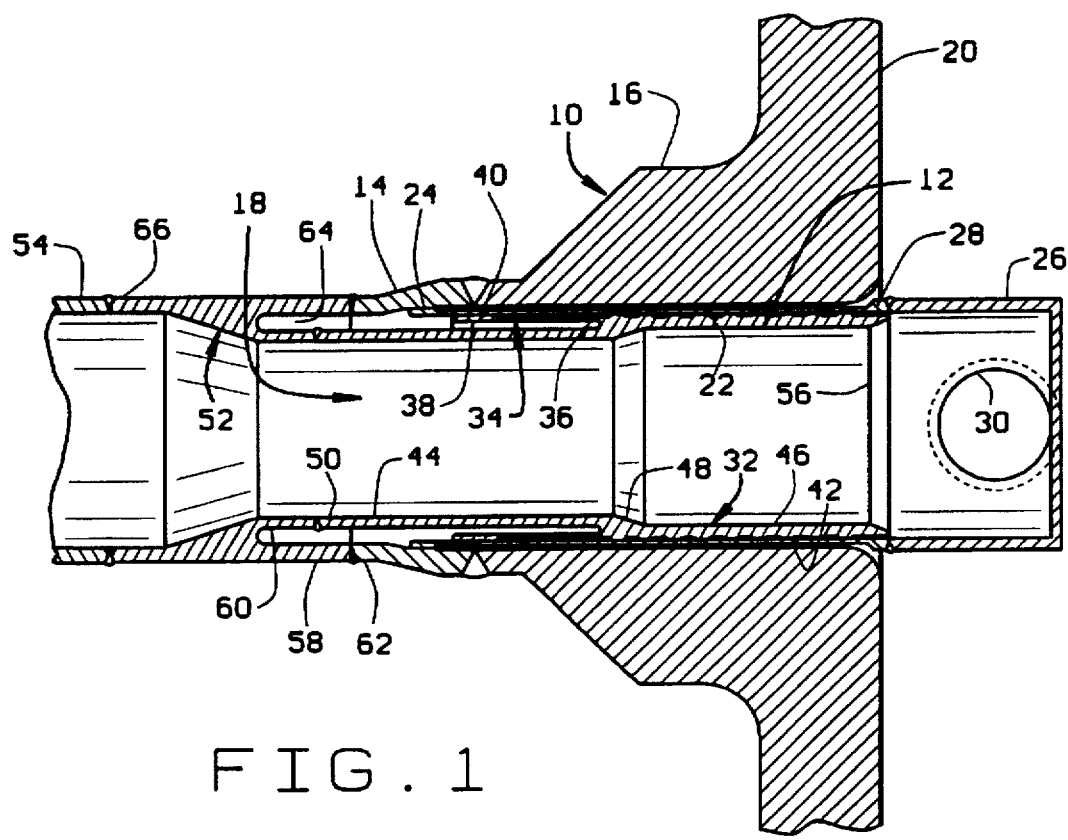
FIG. 1 is a cross section view of a feedwater nozzle including a thermal sleeve in accordance with one embodiment of the present invention.

FIG. 1 is a cross section view of a feedwater nozzle 10 including a thermal sleeve 12 in accordance with one embodiment of the present invention. Feedwater nozzle 10 includes substantially cylindrical nozzle safe end member 14 and a main nozzle member 16. Safe end member 14 is welded to main nozzle member 16. A feedwater nozzle bore 18 extends through safe end member 14 and nozzle member 16. Feedwater nozzle 10 is formed in a reactor pressure vessel (RPV) 20 of a nuclear reactor.

A substantially cylindrical outer thermal sleeve 22 is positioned within bore 18. Sleeve 22 forms a tight fit within bore 18. More specifically, an outer surface of outer sleeve 22 is in substantial surface-to-surface contact with bore 18 at a nozzle safe end wall 24. A feedwater sparger T-box 26 is welded to one end 28 of outer sleeve 22. T-box 26 includes openings 30 for spraying water into RPV 20.

Thermal sleeve 12, which is sometimes referred to herein as inner thermal sleeve 12, also is located within nozzle bore 18. Inner thermal sleeve 12 includes a substantially cylindrical main body 32 and a substantially cylindrical interference ring 34 having a first secured end 36 and a second free end 38. Interference ring 34 is connected at first secured end 36 to an exterior surface of substantially cylindrical main body 32. An interference surface 40 is located at second free end 38 of interference ring 34. Second free end 38 of interference ring 34 is biased so that when sleeve 12 is positioned in nozzle bore 18, second free end 38 is biased outward towards, and in press fit engagement with, an inner surface of outer sleeve 22. An outer surface 42 of substantially cylindrical main body 32 forms a loose fit with outer thermal sleeve 22.

Main body 32 of inner thermal sleeve 12 includes a first substantially cylindrical section 44, a second substantially cylindrical section 46, and an intermediate frustoconical section 48. One end 50 of first substantially cylindrical section 44 is configured to interface with a safe end extension, or connector, 52 for connecting inner thermal sleeve 12 to a feedwater line 54. One end 56 of second substantially cylindrical section 46 is configured to interface with T-box 26.

Connector 52 has a first substantially cylindrical extension 58 and a second substantially cylindrical extension 60. First substantially cylindrical extension 58 is configured to be welded on an end 62 of safe end member 14. Second substantially cylindrical extension 60 is configured to be welded to end 50 of inner thermal sleeve 12. First and second substantially cylindrical extensions 58 and 60 cooperate with nozzle safe end wall 24, outer sleeve 22 and inner sleeve 12 to define a stagnant water area 64. One end 66 of connector 52 is configured to be welded to feedwater line 54.

Figure 2:
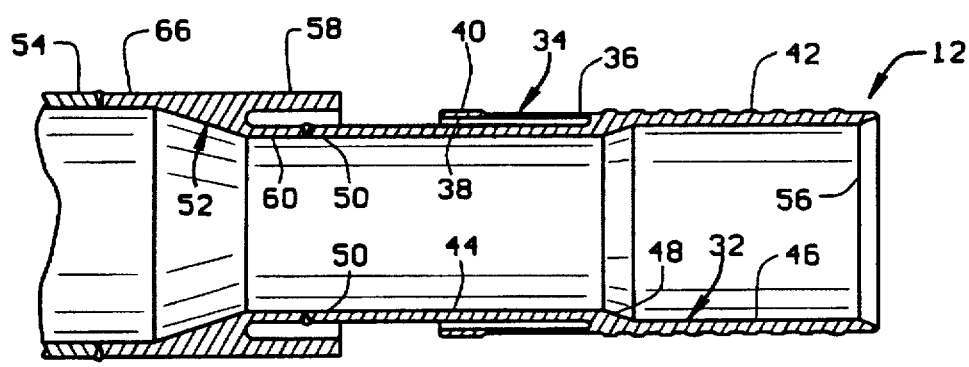
FIG. 2 is a cross section view of the thermal sleeve shown in FIG. 1.

FIG. 2 is a cross section view of thermal sleeve 12 and connector 52 shown in FIG. 1. As shown in FIG. 2, ring 34 is integral with main body 32 of thermal sleeve 12. Alternatively, ring 34 could be formed separately from body 32 and then welded to body 32. Sleeve 12 and connector 52 may be constructed from stainless steel.

Figure 3:
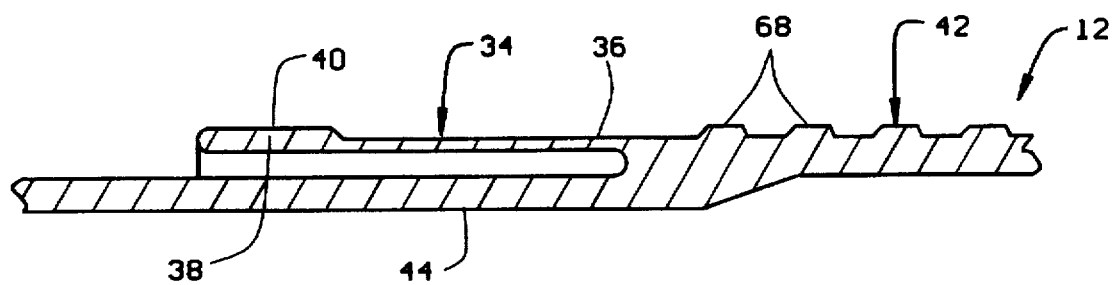
FIG. 3 is an exploded cross section view of a portion of the thermal sleeve shown in FIG. 2.

FIG. 3 is an exploded view of a portion of thermal sleeve 12 shown in FIG. 2. Ridges 68 having relatively flat upper surfaces are formed on surface 42 of sleeve 12. The flat upper surfaces of ridges 68 are in close proximity, and facilitate maintaining a restricted annulus with outer sleeve 22.

In operation, stagnant water located in stagnant water area 64 and the long heat conductive path between second free end 38 of interference ring 34 and thermal sleeve main body 32 form thermal barriers which facilitate maintaining second free end 38 of interference ring 34 heated above the colder feedwater temperature of the feedwater flowing in main body 32 of thermal sleeve 12. As a result, the temperature of second free end 38 of interference ring 34 is maintained close to, and closely tracks, the temperature of outer sleeve 22 and nozzle 10. Therefore, second free end 38 of interference ring 34 is subjected to substantially the same thermal conditions as outer sleeve 22, which enables second free end 38 to maintain tight contact with outer sleeve 22, and also enables outer sleeve 22 to maintain a tight contact with safe end member 14.

Thermal sleeve 12 is believed to be effective in preventing feedwater leakage flow. Sleeve 12 also can be relatively quickly installed so that reactor shut-down time and personnel radiation exposure are reduced as compared to the shut-down time and exposure associated with installing known thermal sleeves.

Figure 4:
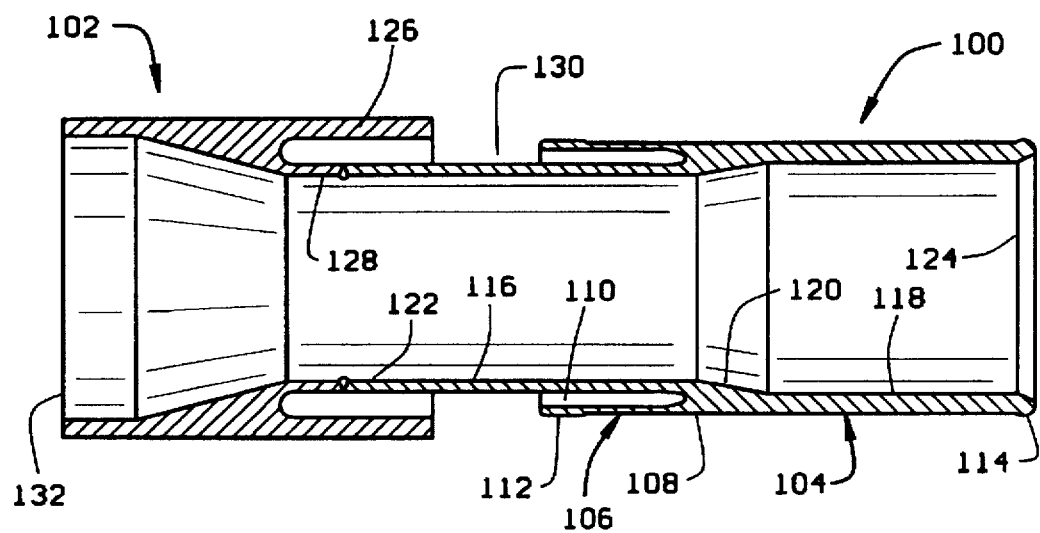
FIG. 4 is a cross section view of a thermal sleeve in accordance with another embodiment of the present invention.

FIG. 4 is a cross section view of a thermal sleeve 100 and connector 102 in accordance with another embodiment of the present invention. Thermal sleeve 100 and connector 102 could be used in place of sleeve 12 and connector 52 shown in FIG. 1. Referring now specifically to FIG. 4, sleeve 100 includes a substantially cylindrical main body 104 and a substantially cylindrical interference ring 106 having a first secured end 108 and a second free end 110. Interference ring 106 is connected at first secured end 108 to an exterior surface of substantially cylindrical main body 104. An interference surface 112 is located at second free end 110 of interference ring 106. Second free end 110 of interference ring 106 is biased so that when sleeve 100 is positioned in the nozzle bore, second free end 110 is biased outward towards, and in press fit engagement with, an inner surface of, for example, outer sleeve 22 (FIG. 1). An outer surface 114 of substantially cylindrical main body 104 forms a close fit with, for example, outer thermal sleeve 22 (FIG. 1).

Main body 104 of inner thermal sleeve 100 includes a first substantially cylindrical section 116, a second substantially cylindrical section 118, and an intermediate frustoconical section 120. One end 122 of first substantially cylindrical section 116 is configured to interface with safe end extension, or connector, 102 for connecting thermal sleeve 100 to a feedwater line (not shown). One end 124 of second substantially cylindrical section 118 is configured to interface with T-box (not shown).

Connector 102 has a first substantially cylindrical extension 126 and a second substantially cylindrical extension 128. First substantially cylindrical extension 126 is configured to be welded to a safe end member of the nozzle (not shown). Second substantially cylindrical extension 128 is configured to be welded to end 122 of thermal sleeve 100. First and second substantially cylindrical extensions 126 and 128 cooperate with the nozzle safe end wall, the outer sleeve and inner sleeve 100 to define a stagnant water area 130. One end 132 of connector 102 is configured to be welded to the feedwater line (not shown).

Thermal sleeve 100 shown in FIG. 4 is similar to thermal sleeve 12 shown in FIG. 1, 2 and 3. One difference, however, is that thermal sleeve 100 includes surface, or protrusion, 114 which makes close contact with the outer sleeve. The length of sleeve 100 between surfaces 114 and 112 generally is not in contact with, and is spaced from, the outer sleeve. Sleeve 12, on the other hand, includes surface 42 (see FIG. 3) having ridges 68 with relatively flat upper surfaces. The flat upper surfaces of ridges 68 are in close proximity with outer sleeve 22.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A thermal sleeve for insertion into a feedwater nozzle bore of a reactor pressure vessel for a nuclear reactor, said sleeve comprising:

a substantially cylindrical main body; and a substantially cylindrical interference ring having a first secured end and a second free end, said ring connected at said first secured end to an exterior surface of said substantially cylindrical main body, an interference surface located at said second free end of said ring, said main body and said interference ring being integral.

2. A thermal sleeve in accordance with claim 1 wherein said main body comprises a first substantially cylindrical section, a second substantially cylindrical section, and an intermediate frustoconical section.

3. A thermal sleeve in accordance with claim 2 wherein one end of said first substantially cylindrical section is configured to interface with a connector for connecting said sleeve to a feedwater line.

4. A thermal sleeve in accordance with claim 2 wherein one end of said second substantially cylindrical section is configured to interface with a feedwater sparger T-box.

5. A thermal sleeve in accordance with claim 1 wherein said second free end of said cylindrical interference ring is biased so that when said sleeve is positioned in the nozzle bore, said second free end is biased towards the nozzle bore wall.

6. A feedwater nozzle thermal sleeve assembly for use in a feedwater nozzle bore of a reactor pressure vessel feedwater nozzle, the nozzle including a safe end member, said thermal sleeve assembly comprising:

an outer substantially cylindrical thermal sleeve extending at least partially through the nozzle bore, an outer surface of said outer sleeve being in substantial surface-to-surface contact with a wall of the nozzle safe end member, and an inner thermal sleeve located within the nozzle bore, said inner thermal sleeve comprising a substantially cylindrical main body, and a substantially cylindrical interference ring having a first secured end and a second free end, said ring connected at said first secured end to an exterior surface of said substantially cylindrical main body, an interference surface located at said second free end of said ring, an outer surface of said substantially cylindrical main body configured to form a loose fit with an inner surface of said outer thermal sleeve.

7. A feedwater nozzle thermal sleeve assembly in accordance with claim 6 wherein said main body comprises a first substantially cylindrical section, a second substantially cylindrical section, and an intermediate frustoconical section.

8. A feedwater nozzle thermal sleeve assembly in accordance with claim 7 wherein one end of said first substantially cylindrical section is configured to interface with a connector for connecting said inner sleeve to a feedwater line.

9. A feedwater nozzle thermal sleeve assembly in accordance with claim 7 wherein one end of said second substantially cylindrical section is configured to interface with a feedwater sparger T-box.

10. A feedwater nozzle thermal sleeve assembly in accordance with claim 6 wherein said second free end of said cylindrical interference ring is biased so that when said inner sleeve is positioned in the nozzle bore, said second free end is biased towards and in press fit engagement with said outer sleeve.

11. A feedwater nozzle thermal sleeve assembly in accordance with claim 6 wherein said main body and said interference ring of said inner thermal sleeve are integral.

12. A feedwater nozzle thermal sleeve assembly in accordance with claim 6 further comprising a connector having a first substantially cylindrical extension and a second substantially cylindrical extension, said first substantially cylindrical extension configured to be welded to the nozzle safe end member and said second substantially cylindrical extension configured to be welded to an end of said inner thermal sleeve.

13. A feedwater nozzle thermal sleeve assembly in accordance with claim 12 wherein said first and second substantially cylindrical extensions of said connector cooperate with the nozzle safe end member wall and said outer sleeve and said inner sleeve to define a stagnant water area.

14. A feedwater nozzle thermal sleeve assembly in accordance with claim 12 wherein one end of said connector is configured to be welded to a feedwater line.

* * * * *